United States Patent [19]

Einhorn et al.

[11] 4,196,883

[45] Apr. 8, 1980

[54] HOLLOW WALL FASTENER

[75] Inventors: Ruediger Einhorn, Katonah; Lee R. Chasen, Port Chester; Joseph W. Blake, III, South Salem, all of N.Y.

[73] Assignee: Coats & Clark, Inc., Stamford, Conn.

[21] Appl. No.: 863,241

[22] Filed: Dec. 22, 1977

[51] Int. Cl.² .......................................... F16M 13/00
[52] U.S. Cl. ................... 248/546; 248/231.1; 403/252; 85/1 P; 85/3 R
[58] Field of Search ............ 248/71, 216.3, 220.2, 248/231.1, 304; 85/3 R, 3 K, 3 S; 403/252

[56] References Cited

U.S. PATENT DOCUMENTS

| 231,334 | 8/1880 | Kraus | 85/3 R |
|---|---|---|---|
| 429,781 | 6/1890 | Shimer | 248/360 X |
| 860,762 | 7/1907 | McGrady | 248/216.3 X |
| 918,063 | 4/1909 | Klahre | 85/3 R |
| 1,168,257 | 1/1916 | Kennedy | 85/3 R |
| 1,738,133 | 12/1929 | Anderson | 85/3 R |
| 2,942,819 | 6/1960 | Brogan | 248/71 X |
| 3,995,822 | 12/1976 | Einhorn et al. | 248/304 |

FOREIGN PATENT DOCUMENTS 10046  3/1894  United Kingdom ................ 85/3 R

*Primary Examiner*—William H. Schultz
*Attorney, Agent, or Firm*—Burgess, Ryan and Wayne

[57] ABSTRACT

A hollow wall fastener using a specially shaped or conventional toggle bolt and a toggle anchor which is pointed and which has an open groove for receiving the toggle bolt. The end of the groove has a threaded portion which cooperates with a threaded portion of an aperture opposite the groove to permit the anchor to pivot with respect to the bolt to a position where the bolt is threadably engaged and locked in the threaded portions of the anchor, forming a "T" configuration behind the surface of the hollow wall. Thereafter the bolt may be rotated, e.g. by turning a screw or fastener body, to draw the anchor tightly against the interior of the hollow wall.

23 Claims, 15 Drawing Figures

HOLLOW WALL FASTENER

This invention relates to a hollow wall fastener, and a toggle anchor for use therein.

Hollow wall fasteners are employed where it is desired to secure an object to a hollow wall (such as a sheet rock wall, hollow door, hollow casting, etc.) with greater mounting strength than can be achieved by means of conventional screw or nail. Hollow wall fasteners of the toggle type generally employ an element which is driven through the hollow wall or inserted in a predrilled hole therein, with the inserted element being thereafter expanded or changing its position so as to prevent removal of the fastener from the wall.

Presently utilized toggle hollow wall fasteners, however, generally require making a hole in the wall (either by impact or drilling) which is much larger than the toggle bolt which extends through the wall surface itself after the installation is completed. The relatively large hole is required to accommodate the bulky toggle element. Thus there is a need for a toggle hollow wall fastener which requires a smaller hole than presently known fasteners for a given toggle bolt diameter, and which is economical to manufacture.

As herein described there is provided a hollow wall fastener comprising a threaded toggle bolt; means for driving, pulling and rotating said bolt; and an elongated toggle anchor having a longitudinal recess for receiving one end of said bolt in longitudinal alignment with the longitudinal axis of said anchor; means for preventing longitudinal axial movement of said bolt relative to said anchor while said bolt and anchor are in said alignment; means for permitting pivoting of said anchor with respect to said bolt about a pivot axis within said anchor, from said alignment position to another position in which the longitudinal axis of the anchor is substantially perpendicular to the longitudinal axis of said bolt; and means for locking said bolt and anchor in mutually threadably engaged relationship in said other position.

Also described herein is a toggle anchor, comprising an elongated body having a pointed end and an open end, an open groove extending to said open end, the end of said groove remote from said open end terminating in a circular threaded portion subtending an angle slightly greater than 180°, an elongated aperture adjacent and communicating with said circular threaded portion to provide a through-hole in said anchor body, said aperture having a relatively large first part and a circular threaded second part subtending an angle slightly greater than 180°, the threads of said circular portion and circular part having the same inner and outer diameter and pitch and being aligned so that a line through the centers thereof is nearly perpendicular to the longitudinal axis of said body.

IN THE DRAWINGS

FIGS. 1, 1a, 1b and 1c illustrates the manner of installation of a hollow wall fastener according to a preferred embodiment of the invention;

Figure 1A:
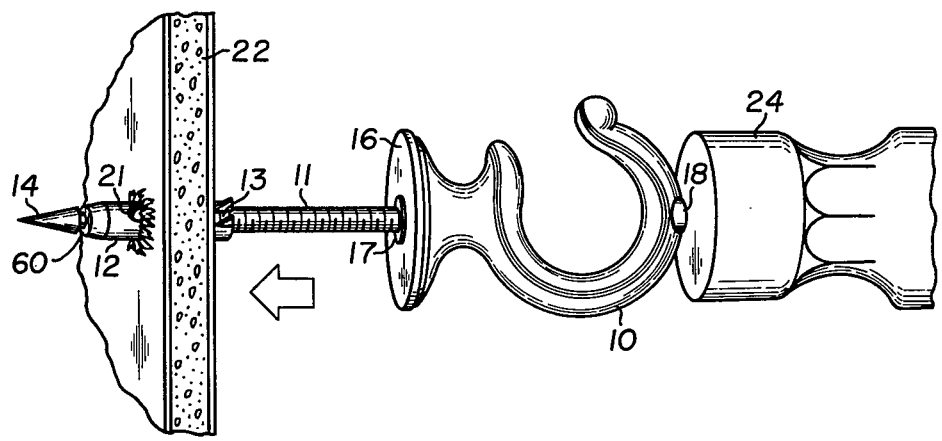

As seen in FIG. 1, the hollow wall fastener comprises three portions, i.e. a fastener body 10, threaded toggle bolt 11, and an elongated toggle anchor 12 having an open groove 13, a pointed end 14, and an elongated aperture 15 opposite and communication with the recess 13.

The fastener body 10 comprises a hook having a flat wall mounting surface 16 and a threaded aperture 17 for threadably receiving the toggle bolt 11. Alternatively, the toggle bolt 11 may be welded or otherwise permanently affixed to the hook 10.

The fastener body or hook 10 also has a flat impact receiving surface portion 18 disposed in alignment with the toggle bolt receiving recess 17. Alternatively, the hook 10 may simply be provided with a construction such that it can take impact without deflecting sidewards.

Rather than being threadably engaged with the fastener body 10 via the recess 17, the toggle bolt 11 may alternatively be welded, glued or otherwise permanently affixed to the fastener body 10. However, toggle bolt 11 must be installed into anchor 12 before bolt 11 can be glued or welded to body 10 since head 19 cannot pass through opening 13 (in area 20/21). Preferably, the fastener body 10 is formed of a suitable die casting metal such as zinc, and the toggle bolt 11 comprises steel.

The other end of the toggle bolt 11 remote from the fastener body 10 has an enlarged end or head 19. The aperture 15 has a relatively large portion for receiving the head 19, and a relatively small portion 20 which is approximately semicircular and which is threaded to engage the toggle bolt 11 when the same is disposed nearly perpendicular to the longitudinal axis of the anchor 12. The end of the recess 13 also has an approximately semicircular threaded portion 21 for engaging the toggle bolt 11 when it is in said nearly perpendicular position.

Thus the toggle bolt 11 may assume one of three positions relative to the toggle anchor 12, i.e. (i) an installation position (see FIG. 3) in which the bolt extends through the relatively large portion of the aperture 15 and the portion of the groove 13 adjacent the semicircular end 21 thereof, at an angle of approximately 30° with respect to the longitudinal axis of the anchor 12, (ii) an operating installation or utilization position in which the bolt 11 is longitudinally aligned with the axis of the anchor 12, with the head 19 of the bolt being disposed within the anchor and the adjacent portion of the bolt being disposed within the groove 13, and (iii) a locking position in which the bolt 11 threadably engages the approximately semicircular threaded portions 20 and 21 of the anchor body 12, and is disposed nearly perpendicular to the axis of said anchor body.

Figure 1B:
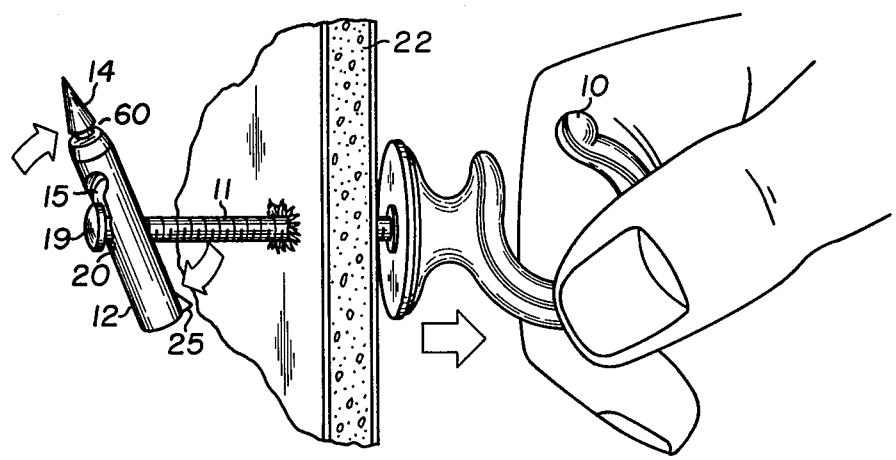
Figure 1C:
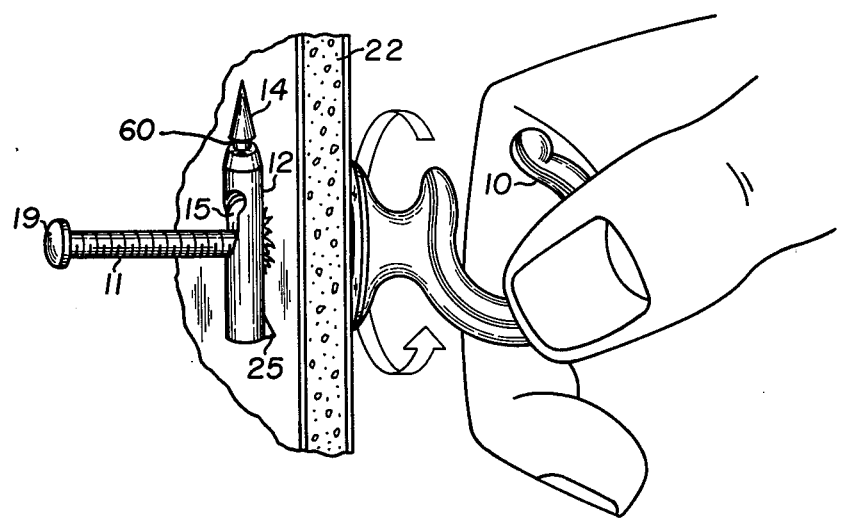

In FIG. 1a the bolt 11 is shown in its operating installation or utilization position relative to the anchor body 12. In FIG. 1b the anchor body 12 is shown in a pivoted intermediate position relative to the bolt 11, and in FIG. 1c the anchor body 12 is shown in its locked position relative to the bolt 11, with the installation of the fastener nearly completed.

The manner in which the fastener comprising parts 10, 11 and 12 is utilized will be best understood by reference to FIG. 1, which illustrates the installation procedure in a hollow sheet rock wall 22.

The fastener body 10, bolt 11 and anchor body 12 are initially assembled with the anchor body 12 in its operation or utilization position relative to the bolt 11, i.e. in axial alignment therewith. This is done by slipping the threaded end portion of the bolt 11 through the opening 15 in the anchor body 12, then threading the bolt into the fastener body 10 and rotating the anchor body so the bolt 11 is in the groove 13 thereof. In this position forward axial movement of the bolt 11 relative to the anchor 12 is prevented by the solid pointed end 14 of the anchor, and rearward movement of the bolt 11 relative to the anchor 12 is prevented by engagement of the shoulder portion of the head 19 of the bolt 11 with a shoulder 23 formed within the toggle anchor 12. Thus in this utilization position the bolt 11 is prevented from longitudinal axial movement relative to the anchor 12, and these two parts operate as a single unit while the anchor 12 and adjacent end of the bolt 11 are being driven through the wall 22.

The primary function of bolt head 19 is to prevent toggle anchor 12 from falling off bolt 11 behind the hollow wall 22 as would otherwise happen during the pull-back step illustrated in FIG. 1b.

A hammer or other suitable impact tool 24 is employed to apply impact forces to the impact receiving area 18 of the hook or fastener body 10, to drive the pointed end 14 of the toggle anchor 12 through the wall 22, together with the adjacent portion of the toggle bolt 11. This step is illustrated in FIG. 1a.

After the toggle anchor 12 has penetrated entirely through the wall 22, as shown in FIG. 1b, the fastener body 10 is abruptly rotated or "jiggled" back and forth to dislodge the toggle anchor 12 from its aligned or utilization position relative to the bolt 11, causing the anchor 12 to pivot about the bolt 11 to an intermediate oblique position. Then the fastener body 10 is pulled away from the wall 22 to draw the toggle anchor 12 against the wall 22. The pointed projections 25 adjacent the recess 13 at the open end of the toggle anchor engage the interior surface of the wall 22 and prevent rotation of the anchor 12 with the bolt 11. As pulling on the fastener body 10 continues, the anchor 12 is rotated further, so that the bolt 11 snaps into the threaded recesses 20 and 21, thus threadably engaging the bolt 11 with said recesses and locking the anchor 12 onto the bolt 11, at an angle such that the longitudinal axis of the anchor 12 is nearly perpendicular to the axis of the bolt 11, i.e. preferably about four degrees short of perpendicularity or at an angle of 86° between the anchor and bolt axes.

Thereafter, the fastener body or hook 10 is rotated while exerting a pulling force thereon, to maintain the toggle anchor 12 against the interior surface of the wall 22 so that rotation of the anchor is prevented and the bolt 11 may be threaded onto the anchor parts 20 and 21 to tighten the connection, i.e. shorten the distance between the anchor 12 and the fastener body mounting surface 16 until the fastener body is secured to the wall 22. During this tightening process the slight angle (approximately 4°) between the normal to the bolt 11 and the axis of the toggle anchor 12 ensures that the projections 25 solidly engage the interior surface of the wall 22 to prevent rotation of the toggle anchor while the bolt 11 is being rotated. The locking engagement between the bolt 11 and the threaded parts 20 and 21 of the anchor 12 ensures that the anchor 12 does not slide along the bolt 11 to loosen the connection during the intervals between turns of the fastener body or hook 10.

In order to facilitate free pivoting movement of the toggle anchor 12 with respect to the bolt 11, the pivot axis therebetween, i.e. the point of intersection of the longitudinal axes thereof, should preferably be coincident with or close to the center of gravity of the anchor 12.

Preferably, the force required to lock the bolt 11 into threadable engagement with the parts 20 and 21 of the anchor 12, measured at a distance of 2 inches from the pivot point therebetween, should be on the order of 20 to 80 ounces, with a range of 26 to 56 ounces being most desirable.

While the toggle anchor 12 may have a pointed end 14 which is permanently affixed thereto, alternatively a narrowed section may be provided between the pointed end 14 and the remainder of the anchor 12, as shown in FIGS. 2-6, so that if desired the pointed end 14 may be removed for installations in which the anchor 12 is to be inserted through a predrilled hole in the hollow wall or door. A shorter bolt 11 is used for hollow door installations to prevent damage to the opposite door surface. When the toggle is used in a hollow door as described above, the narrowed section of the tip of the anchor body 12 is used as break off point. Available space for tilting of the toggle anchor inside the hollow door is limited; therefore the toggle anchor must be shortened and its point is not needed in any case since in the hollow door a hole will be predrilled. In a hollow wall where the wall is of wood or plaster, point 14 is not removed as long as there is enough room for the toggle to turn. Such predrilled installations are normally employed where the wall comprises plaster or wood. The toggle anchor 12 is preferably made of a suitable die casting metal such as zinc. However, brass and plastic would also be suitable materials.

The toggle anchor 12 may be made by die casting, with the threaded parts 20 and 21 having threads cut therein in a secondary operation after the die casting step has been completed. As previously mentioned, these threads are cut at an angle approximately 4° off the normal to the anchor body longitudinal axis, to provide the desired locked position of the anchor such that the projections 25 extend toward the interior surface of the hollow wall within which the anchor 12 is to be installed. However, if the anchor 12 tilts beyond the normal to the wall, projections 25 may not work. Such an anchor would slip around on the inside wall surface and could not be tightened.

Figure 2:
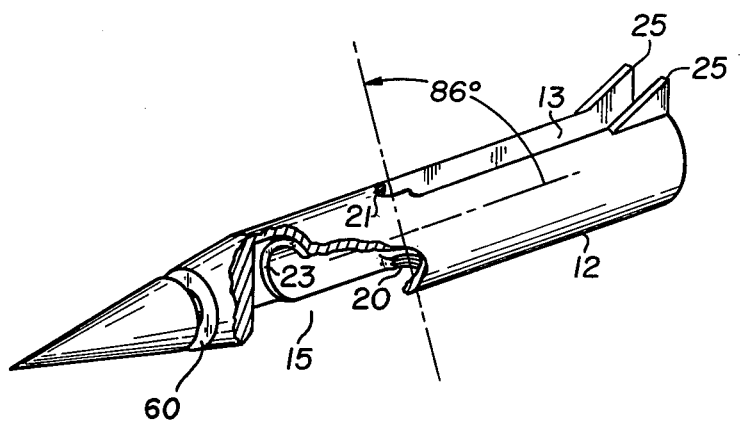
FIG. 2 is a partially cut away perspective view of a toggle anchor according to a preferred embodiment of the invention.

The detailed construction of the toggle anchor 12 is shown in FIGS. 2 and 4-6, with FIG. 2 showing most clearly the groove 13 and the threaded parts 20 and 21, each of which subtends an angle of slightly greater than 180°, typically 185°-200°. It is this extension of the apertures 20 and 21 beyond a semicircular configuration which provides the snap action fit of the bolt 11 to threadably engage the same. Even a slight knife edge extension beyond 180° on both sides of the apertures 20 and 21 would be sufficient to provide a snap-in feature.

Figure 3:
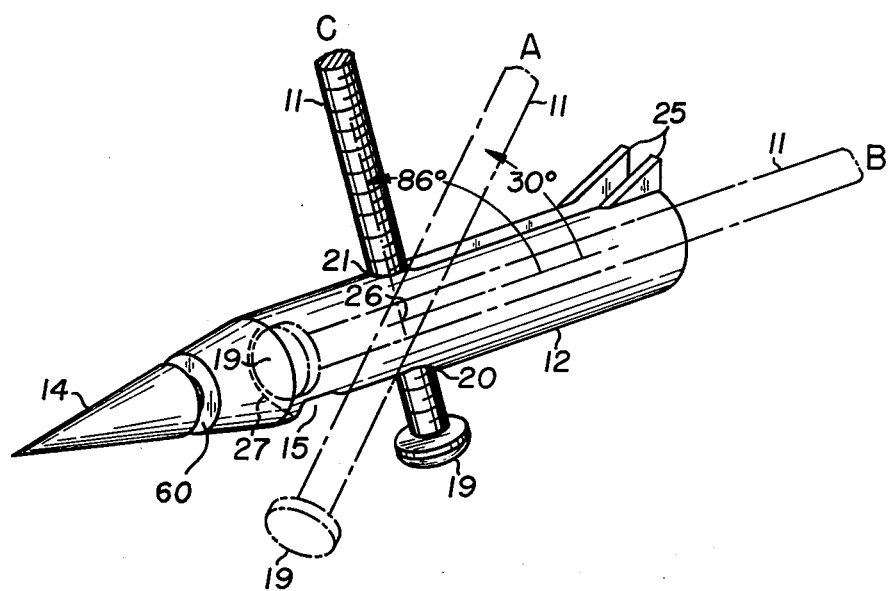
FIG. 3 is a side cross sectional view of the anchor of FIG. 2.
Figure 4:
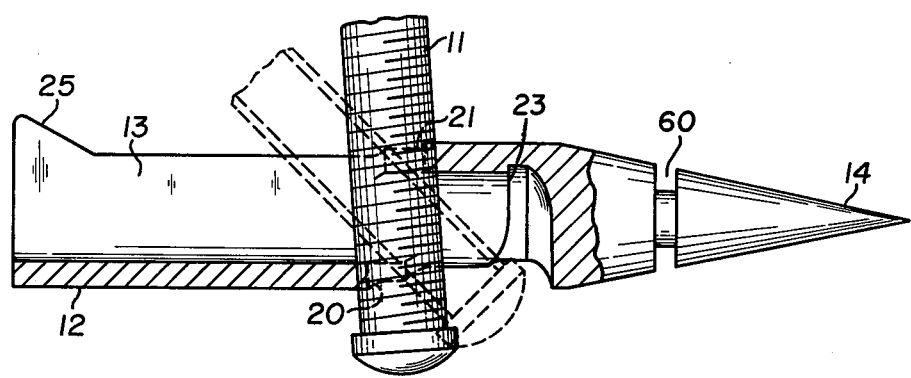
FIG. 4 is a left side view of said anchor.
Figure 5:
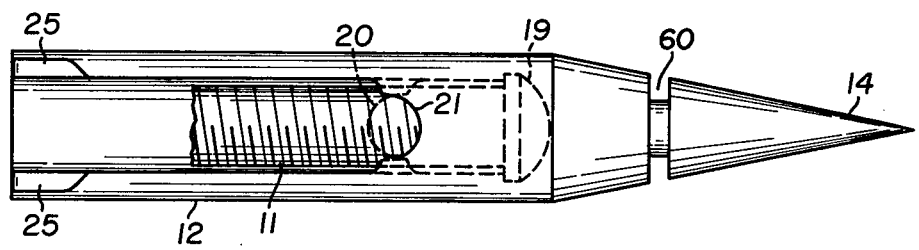
FIG. 5 is a top plan view of said anchor.
Figure 6:
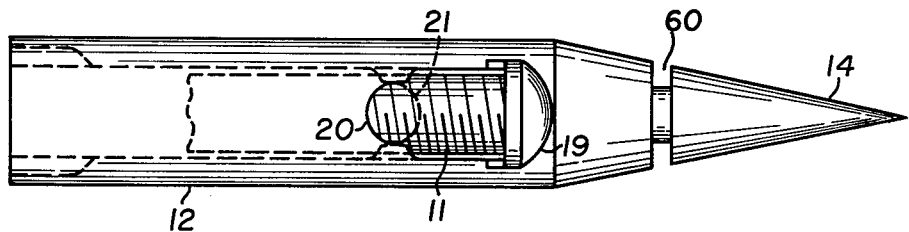
FIG. 6 is a bottom plan view of said anchor.

FIG. 3 illustrates the three interactive positions of the bolt 11 relative to the toggle anchor 12, as they are mutually rotated about the phantom or imaginary pivot point 26. The installation position, i.e. wherein the bolt 11 is initially inserted into the anchor 12, as indicated at A; the operating or utilization position, into which the bolt 11 is rotated from position A, is indicated at B, wherein the longitudinal axes of the bolt 11 and toggle anchor 12 are mutually aligned, with the head 19 of the bolt being disposed within the body of the anchor 12. As is most clearly visible in FIG. 3, the forward portion of the anchor 12 adjacent the pointed end 14 thereof terminates in a curved wall 27 which is contoured to abut the head 19 of the bolt 11. The locked position of the bolt 11, in which it threadably engages the apertures 20 and 21, is illustrated at C.

Figure 7:
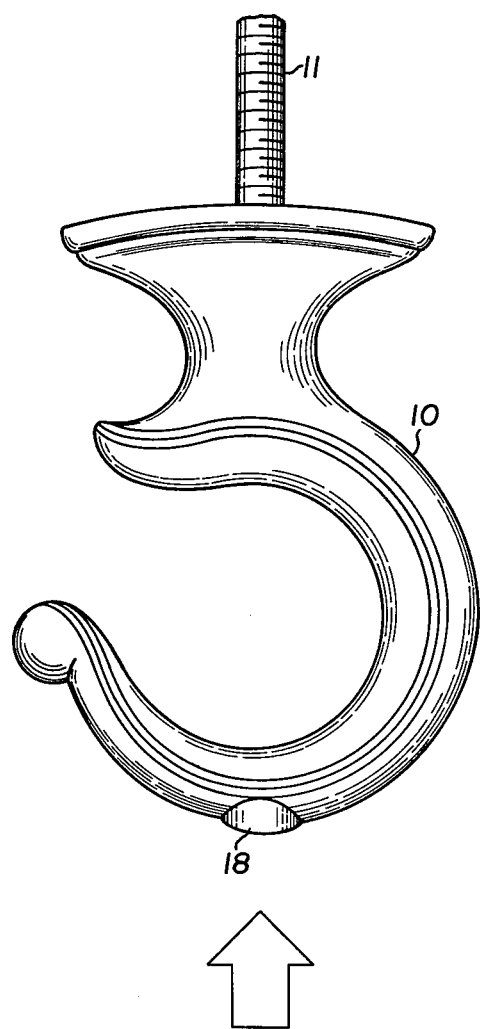
FIG. 7 shows a hook fastener body according to a preferred embodiment of the invention.

As shown in FIG. 7, the impact receiving area 18 is aligned with the toggle bolt 11 when the same is affixed to the hook or fastener body 10.

Figure 8:
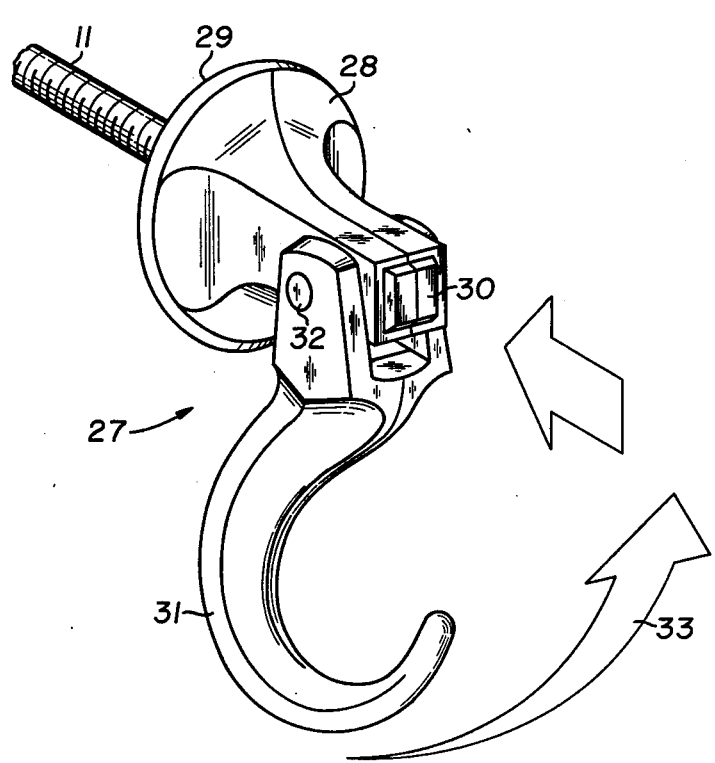
FIG. 8 shows a hook fastener body according to another embodiment of the invention.

For some applications considerations of impact strength or aesthetics may preclude the application of an impact force to the end of the hook 10 shown in FIG. 7. FIG. 8 shows an alternative type of hook construction, in which the hook 27 comprises a first portion 28 having a mounting surface 29 at one end and a parallel flat impact receiving surface 30 at the other end. A second portion 31 is pivotally coupled to the first portion 28 about a pivot axis 32. To install the fastener of the invention employing the fastener body or hook 27, the second portion 31 thereof is positioned as shown in FIG. 8, to expose the impact receiving surface 30. A hammer or other impact tool is then applied to the surface 30 to drive the toggle anchor (not shown in FIG. 8) into a hollow wall via the bolt 11, and thereafter the second or hook portion 31 is rotated in the direction of the arrow 33 to place the hook portion 31 in its usage position, and to cover the impact surface, which may have been damaged or esthetically changed as a result of the application of impact forces thereto.

Other fastener bodies than the hooks 10 and 33 may obviously be employed. Such fastener bodies may be in the form of screw heads, knobs, shelf brackets, coat hooks, etc.

Figure 9:
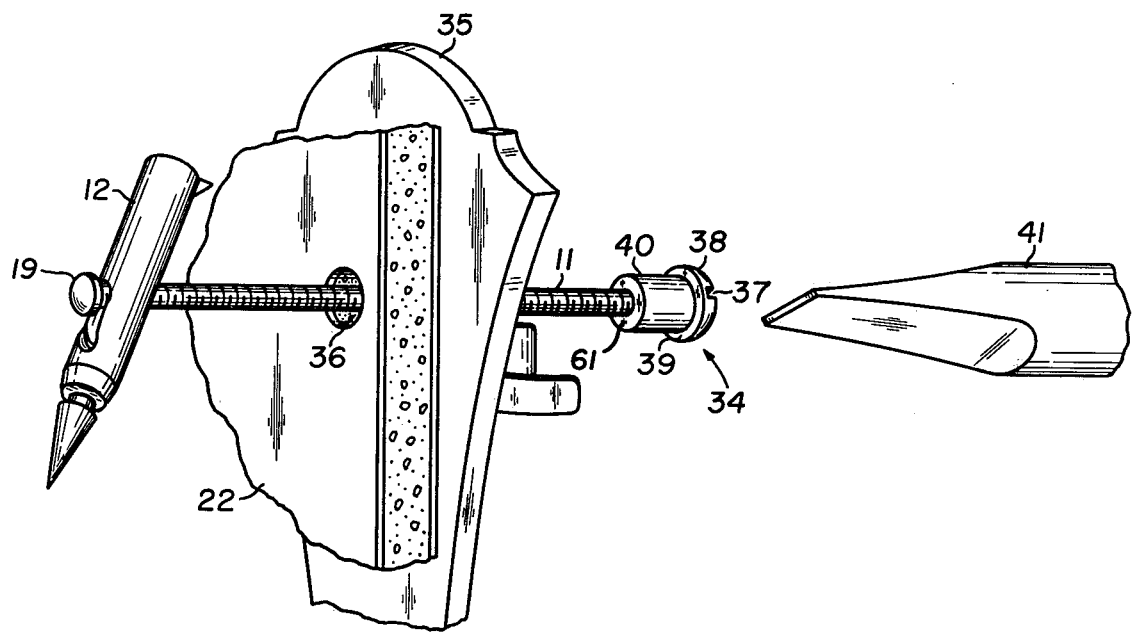
FIG. 9 shows a hollow wall fastener according to a further embodiment of the invention.

For example, as shown in FIG. 9, the fastener herein described may be employed to secure any desired object, such as a bracket 35, to a hollow wall by engaging a hole therein. As seen in FIG. 9, the toggle bolt 11 extends through a hole 36 in the hollow wall 22, and a hole (not visible in FIG. 9) in the bracket 35 aligned therewith. A cast or molded screw head 34 has a screw slot 37, a head portion 38 with a shoulder 39, and a cylindrical portion 40 which is internally threaded to provide a hole 61 to receive the end of the toggle bolt 11.

The fastener shown in FIG. 9 is utilized in essentially the same manner as previously described, except that the toggle anchor 12 is tightened against the inner surface of the wall 22 by utilizing a screwdriver 41 to engage the screw slot 37 and rotate the screw head 34 and toggle bolt 11 to drive the same toward the the inner surface of the wall 22, until the screw head 34 and toggle anchor 12 are tightly engaged with the exposed surface of the bracket 35 and the inner surface of the wall 22 respectively.

Alternatively, the bolt 11 shown in FIG. 9 may be reversed, i.e. with the head 19 outside the hollow wall and in a position to be rotated by the screwdriver 41. In this case the head 19 would of course be provided with a slot for engaging the screwdriver tip. The toggle bolt 11 would then be inserted through the bracket 35 and anchor bolt 12, with the free threaded end of the bolt being threaded to a special head similar to but smaller than the head 34, and without its shoulder portion 40. This arrangement is especially useful if space limitations are present, or if, e.g., the hole in the bracket 35 is too small to receive the cylindrical portion 40 of the screw head 34.

Typically, the hollow wall fastener described above may be employed for securing objects to hollow wood doors, plaster walls, sheet rock walls, or other hollow wall structures. A typical toggle anchor 12 may have a length of 1⅜" for hollow wooden doors and of 2⅛" for most hollow wall, stucco wall, plaster wall or sheet rock wall constructions. The outer diameter of such toggle anchors may be on the order of ¼", and such toggle anchors may typically be employed with toggle bolts having a 6/32 thread. However, a very wide range of anchor and bolt diameters and lengths may be employed, with essentially no limit on how large or how long the bolt may be.

Figures 10, 11:
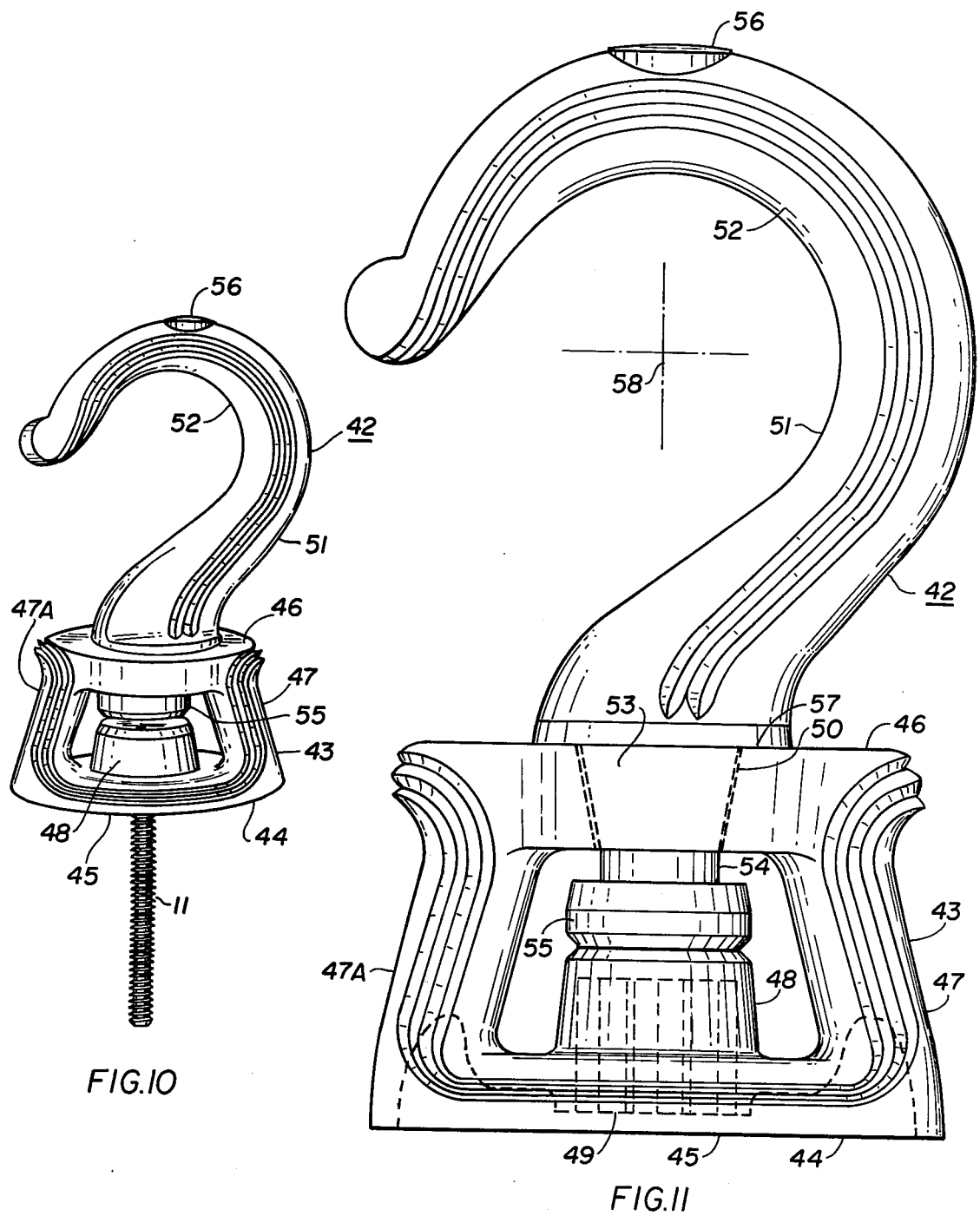
FIG. 10 shows a swivel hook which may be employed as a fastener body according to another embodiment of the invention, in the utilization position thereof.
FIG. 11 shows the swivel hook of FIG. 10 in the installation position thereof.
Figure 12:
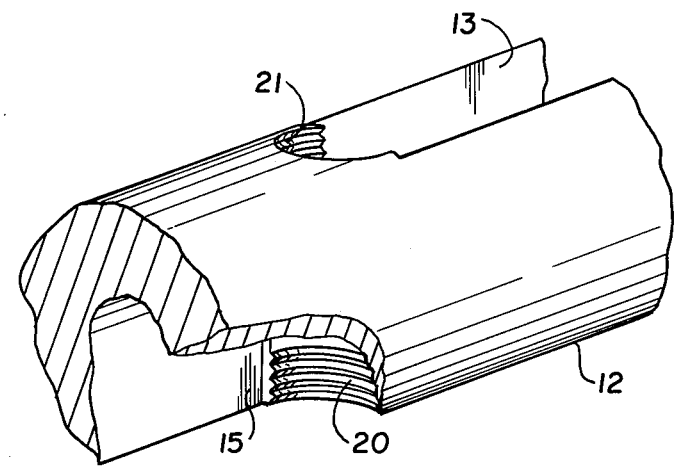
FIG. 12 shows a partially cut away perspective view of the encircled portion of the anchor shown in FIG. 2.
Figure 13:
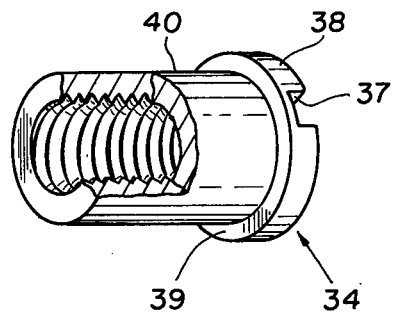
FIG. 13 shows a partially cut away perspective view of the screw head which appears in FIG. 9.

FIGS. 10 and 11 show a swivel hook 42 which may be employed as a fastener body according to another embodiment of the invention. The swivel hook 42 comprises an open frame 43 having a first leg 44 with a flat wall mounting surface 45, a parallel second leg 46, and side legs 47 and 48.

The frame 43 has an anvil portion 48 extending from the first leg 45 toward the second leg 46. A threaded hole 49 is provided in the first leg 44 and anvil 48 adjacent the wall mounting surface 45, to threadably receive the adjacent end of the toggle bolt 11.

The second leg 46 has a frustoconical aperture 50 therein oriented substantially normal to the legs 44 and 46, with the smaller diameter end thereof adjacent the leg 44.

The swivel hook 42 has a hook member 51 with a curved hook portion 52, a swivel portion 53 disposed in the aperture 50 for rotational movement with respect thereto, a projection 54 extending from the swivel portion 53 toward the first leg 44, and an enlarged end portion 55 integral with the projection 54 and disposed adjacent the anvil 48. The hook portion 52 has a flat impact receiving surface 56 remote from the legs 44 and 46 and aligned with the recess 49 for receiving the toggle bolt 11.

The length of the projection 54 is sufficient to enable the enlarged end portion 55 to abut the anvil 48 when the hook member 51 is urged toward the first leg 44.

The hook member 51 has a shoulder part 57 adjacent the second leg 46 for limiting the travel of the enlarged end portion 55 toward the first leg 44.

The hook member 51 cooperates with the open frame 43 to form a free swiveling joint at the interface between swivel portion 53 and aperture 50, the swivel portion 53 and its projection 54 exhibiting circular symmetry about the axis 58 of the swivel hook 42.

Preferably, the hook member 51 and frame 43 are integrally cast to form the swivel joint therebetween. A similarly integrally cast swivel hook is shown, e.g., in FIG. 2 of U.S. Pat. No. 3,995,822 entitled "Swivel Hooks and Method for Making the Same", the disclosure of which is incorporated herein by reference. In said patent, the projection 30 corresponds to the swivel portion 53 of the instant application; the extension 31 corresponds to the projection 54 hereof; and the enlarged end portion 32 corresponds to the end portion 55 hereof.

As explained in the aforementioned patent, the provision of the projection 54 of the swivel hook member 51 allows free swivel movement of the hook member 51 when the hook is in its utilization position with the enlarged end portion 55 abutting the second leg 46, as illustrated in FIG. 10.

When it is desired to apply an impact force to the impact receiving surface 56, the hook member 51 is moved toward the first leg 44, so that the enlarged end portion 55 thereof bears against the anvil 48, to transmit the impact driving force to the end of the toggle bolt 11 threadably received in the recess 49. The shoulder part 57 simultaneously abuts the adjacent surface of the second leg 46 to also limit movement of the swivel portion 53 with respect to the aperture 50, so that in the event the frame 43 should become distorted for any reason, so that the enlarged end portion 55 fails to abut the anvil 48, the impact force will be transmitted via the second leg 46, thus preventing binding of the swivel joint.

After the impact driving force has been applied to the impact receiving area 56, and the toggle bolt 11 has been driven toward a hollow wall as previously described herein, the frame 43 may be rotated to secure the toggle anchor 12 in position against the interior of the hollow wall, and thereafter the hook member 51 may be moved to its utilization position as shown in FIG. 10, thus providing a freely swivelling joint.

Preferably, the length of the projection 54 is at least equal to the distance between the adjacent surfaces of the end portion 55 and anvil 48 when the swivel hook is in its utilization position as shown in FIG. 10.

What is claimed is:

1. A hollow wall fastener comprising a fastener body, a threaded toggle bolt and an elongated toggle anchor,
    said toggle bolt having an enlarged end and another end;
    means for securing the other end of said toggle bolt to said fastener body;
    said toggle anchor having an open longitudinal groove for receiving a portion of the length of said toggle bolt, said groove being open at one end of said anchor and exposed along a first surface portion of said anchor, the end of said groove remote from said one end of said anchor being threaded, approximately semicircular and subtending an angle slightly greater than 180°, so that said bolt may be received in snap-fit fashion in said approximately semicircular groove end when said bolt is positioned nearly perpendicular to the longitudinal axis of the anchor,
    said anchor having an elongated aperture in a second surface portion thereof opposite said first surface portion, said aperture having a first part for receiving said enlarged end of said toggle bolt and a second threaded part which is approximately semicircular and subtends an angle slightly greater than 180°, so that said bolt may be simultaneously received in snap-fit fashion in both said approximately semicircular groove end and second threaded aperture part, with the longitudinal axis of said toggle bolt when so received being nearly perpendicular to the longitudinal axis of said toggle anchor,
    said toggle bolt being loosely slidable with respect to said toggle anchor by insertion of said bolt through the first part of said elongated aperture and a portion of said groove adjacent the approximately semicircular end thereof,
    said toggle bolt being thereafter rotatable (i) toward the longitudinal axis of said toggle anchor to dispose the enlarged end thereof within said anchor and the adjacent portion of said bolt within said groove, and (ii) away from the longitudinal axis of said toggle anchor to lock into and threadably engage said approximately semicircular groove end and second aperture part.

2. The fastener according to claim 1, wherein said toggle anchor includes means for preventing longitudinal axial movement of said toggle bolt when said enlarged end of said bolt is disposed within said anchor and the adjacent portion of said bolt is disposed within said groove.

3. The fastener according to claim 1, wherein in the locked position thereof the longitudinal axis of said toggle bolt and the surface of said toggle anchor adjacent said toggle bolt are disposed at an angle on the order of 86° from each other.

4. The fastener according to claim 1, wherein the force required to lock said toggle bolt into threadable engagement with said toggle anchor, measured at a distance of 2 inches from the pivot axis therebetween, is on the order of 20 to 80 ounces.

5. The fastener according to claim 1, wherein said toggle anchor has a pointed end remote from said groove thereof.

6. The fastener according to claim 3, wherein said toggle anchor has at least one pointed projection extending from said first surface portion adjacent said one end thereof.

7. A toggle anchor, comprising:
    an elongated body having a pointed end and an open end,
    an open groove extending to said open end, the end of said groove remote from said open end terminating in a circular threaded portion subtending an angle slightly greater than 180°;
    an elongated aperture adjacent and communicating with said circular threaded portion to provide a through-hole in said anchor body,
    said aperture having a relatively large first part and a circular threaded second part subtending an angle slightly greater than 180°,
    the threads of said circular portion and circular part having the same inner and outer diameter and pitch and being aligned so that a line through the centers thereof is nearly perpendicular to the longitudinal axis of said body.

8. The toggle anchor according to claim 7, wherein said body comprises a die casting metal.

9. The toggle anchor according to claim 7, further comprising at least one pointed projection on said body adjacent said groove at said open end of said body.

10. The fastener according to claim 1, wherein said fastener body has an impact receiving surface disposed in alignment with the toggle bolt securing means.

11. The fastener according to claim 10, wherein said fastener body has a first portion having said impact receiving surface, and a second portion pivotably coupled to said first portion and movable between a first position exposing said impact receiving surface and a second position covering said impact receiving surface.

12. A hollow wall fastener comprising:
    a threaded toggle bolt;

means for driving, pulling and rotating said bolt; and
a unitary elongated toggle anchor having:
   a longitudinal recess for receiving one end of said bolt in longitudinal alignment with the longitudinal axis of said anchor;
   means for preventing longitudinal axial movement of said bolt relative to said anchor while said bolt and anchor are in said alignment;
   means permitting pivoting of said anchor with respect to said bolt about a pivot axis within said anchor, from said alignment position to another position in which the longitudinal axis of the anchor is substantially perpendicular to the longitudinal axis of said bolt; and
   means comprising an approximately semicircular threaded groove in said anchor for locking said bolt and anchor together in snap-fit fashion in mutually threadably engaged relationship in said other position.

13. The toggle anchor according to claim 7, wherein said pointed end has an annular groove therein to facilitate the breaking off of at least a portion of said pointed end.

14. The toggle anchor according to claim 7, wherein said circular threaded portion comprises a single thread.

15. The fastener according to claim 1, wherein said fastener body comprises a screw head having a threaded hole therein for threadably receiving said other end of said toggle bolt.

16. The toggle anchor according to claim 7, wherein said body comprises a plastic material.

17. The fastener according to claim 1, wherein said enlarged end of said toggle bolt is unslotted.

18. The fastener according to claim 10, wherein said fastener body comprises a swivel hook, said hook comprising:
   an open frame having first and second parallel legs, said first leg having a flat wall mounting surface, an anvil portion adjacent said second leg, and means adjacent said mounting surface for engaging said other end of said toggle bolt,
   said second leg having a frustoconical aperture therein oriented substantially normal to said legs, with the smaller diameter end of said aperture adjacent said first leg; and
   a hook member having a hook portion, a swivel portion disposed in said aperture for rotational movement with respect thereto, a projection extending from said swivel portion toward said first leg, and an enlarged end portion integral with said projection and disposed adjacent said anvil, said impact receiving surface being disposed on said hook portion remote from said legs,
   the length of said projection being sufficient to enable said enlarged end portion to abut said anvil when said hook member is urged toward said first leg.

19. The fastener according to claim 18, wherein said hook member has a shoulder part adjacent said second leg for limiting the travel of said enlarged end portion toward said first leg.

20. The fastener according to claim 18, wherein said toggle bolt engaging means comprises a threaded hole in said mounting surface.

21. A swivel hook comprising:
   an open frame having first and second parallel legs, said first leg having a flat wall mounting surface, an anvil portion adjacent said second leg, and means adjacent said mounting surface for securing said frame to a supporting member,
   said second leg having a frustoconical aperture therein oriented substantially normal to said legs, with the smaller diameter end of said aperture adjacent said first leg; and
   a hook member having a hook portion, a swivel portion disposed in said aperture for rotational movement with respect thereto, a projection extending from said swivel portion toward said first leg, and an enlarged end portion integral with said projection and disposed adjacent said anvil, said hook portion having an impact receiving surface disposed remote from said legs,
   the length of said projection being sufficient to enable said enlarged end portion to abut said anvil when said hook member is urged toward said first leg.

22. The fastener according to claim 21, wherein said hook member has a shoulder part adjacent said second leg for limiting the travel of said enlarged end portion toward said first leg.

23. The fastener according to claim 21, wherein said securing means comprises a threaded hole in said mounting surface.

* * * * *